United States Patent
Kumar et al.

(10) Patent No.: US 10,187,781 B2
(45) Date of Patent: Jan. 22, 2019

(54) METHODS OF EFFICIENTLY SHARING RADIO FREQUENCY (RF) RESOURCES IN A DUAL SIM DUAL STANDBY DEVICE

(71) Applicant: Samsung Electronics Co., Ltd., Suwon-si, Gyeonggi-do (KR)

(72) Inventors: Rohit Kumar, Bangalore (IN); Ashish Kumar Gupta, Bangalore (IN); Balaji Srinivasan Thiruvenkatachari, Bangalore (IN); Shrinath Ramamoorthy Madhurantakam, Bangalore (IN); Swapnil Vinod Khachane, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/907,843

(22) Filed: Feb. 28, 2018

(65) Prior Publication Data
US 2018/0255450 A1    Sep. 6, 2018

(30) Foreign Application Priority Data
Mar. 1, 2017   (IN) .............................. 201741007174

(51) Int. Cl.
*H04W 8/18* (2009.01)
*H04W 4/16* (2009.01)
*H04W 72/04* (2009.01)

(52) U.S. Cl.
CPC ............... *H04W 8/18* (2013.01); *H04W 4/16* (2013.01); *H04W 72/0453* (2013.01)

(58) Field of Classification Search
CPC ........ H04W 8/18; H04W 4/90; H04L 43/0888
See application file for complete search history.

(56) References Cited

U.S. PATENT DOCUMENTS

| 8,761,788 | B2 | 6/2014 | Rajurkar et al. |
| 2017/0289889 | A1* | 10/2017 | Sahu .................... H04L 43/0888 |
| 2018/0176887 | A1* | 6/2018 | Strobl .................... H04W 4/90 |

* cited by examiner

*Primary Examiner* — Myron K Wyche
(74) *Attorney, Agent, or Firm* — Harness, Dickey & Pierce, P.L.C.

(57) ABSTRACT

Some example embodiments provide a method performed by a dual subscriber identification module (SIM) dual standby (DSDS) controller for efficiently sharing radio frequency (RF) resources in a DSDS device, the method comprising: receiving, when a data session is ongoing in a first SIM, a request from a second SIM for access to the RF resources for performing an activity at the second SIM having higher priority than the data session; determining a scaled throughput for the first SIM; determining an RF rejection percentage for the second SIM based on the scaled throughput; and providing the second SIM with access to the RF resources based on the RF rejection percentage.

20 Claims, 4 Drawing Sheets

METHODS OF EFFICIENTLY SHARING RADIO FREQUENCY (RF) RESOURCES IN A DUAL SIM DUAL STANDBY DEVICE

PRIORITY

This application claims priority under 35 U.S.C. § 119(a) to an Indian Patent Application Serial No. 201741007174 (CS), which was filed on Mar. 1, 2017 in the Indian Intellectual Property Office, the entire disclosure of which is incorporated herein by reference.

TECHNICAL FIELD

Some example embodiments relate to mobile communications, and more particularly to methods of efficiently sharing Radio Frequency (RF) resources in dual SIM dual standby (DSDS) devices.

BACKGROUND

In recent years, multi subscriber identification modules (SIM) devices have become more popular because a user may maintain multiple connections in a single user equipment (UE). One type of multi-SIM device referred to as a dual SIM dual standby (DSDS) device, shares a common radio frequency (RF) resource between two SIMs namely SIM1 and SIM2. Both SIMs are capable of operating using different radio access technologies (RATs). For example, SIM1 is capable of providing long term evolution (LTE) services to the user and SIM2 is capable of providing second generation (2G) related services to the user. Since, the SIMs of the DSDS device share a single RF resource, the device allows only one SIM to have active communication with a network thereby providing limited service to the other SIM.

For example, suppose that the UE establishes a data session with an LTE network using SIM1. The performance of the UE in the LTE network is defined by LTE throughput, which denotes a rate at which the UE is receiving and transmitting data. Since, only one RF resource is available, SIM2 also requests RF resources for performing higher priority activities. Some of the high priority activities include at least one of sending a signaling request to a network, checking a paging channel, reading system information, measuring serving and neighbor cell signal strength, establishing a packet switched (PS) data session and the like. Therefore, in response to a request from SIM2, SIM1 shares the RF resource with SIM2, thereby reducing RF resource availability to SIM 1. Hence, the UE may under-utilize network resources and in turn, a network may penalize the UE, leading to poor LTE performance at the LTE DSDS UE.

In view of the foregoing, methods for efficiently sharing RF resources in a DSDS device may be desirable.

SUMMARY

Some example embodiments herein provide a method performed by a dual subscriber identification module (SIM) dual standby (DSDS) controller for efficiently sharing radio frequency (RF) resources in a DSDS device. The method includes receiving, when a data session is ongoing in a first SIM, a request from a second SIM for access to the RF resources for performing an activity at the second SIM having higher priority than the data session. The method further includes determining a scaled throughput for the first SIM. The method further includes determining an RF rejection percentage for the second SIM based on the scaled throughput. Furthermore, the method includes providing the second SIM with access to the RF resources based on the RF rejection percentage.

According to some example embodiments, the scaled throughput (ScTP) for the first SIM is determined by considering one or more factors such as a load on a network side, a type of network being deployed, a direction of data transfer, a type of radio access technology (RAT) used by the first SIM, a mobility condition of the DSDS device, or a signal quality of other RATs.

According to some example embodiments, the scaled throughput is determined based on an inverse term of the load on the network side.

According to some example embodiments, the scaled throughput is determined based on a ratio of maximum bandwidth to a serving cell bandwidth.

According to some example embodiments, the activity to be performed by the second SIM includes an activity belonging to a defined group of high priority activities.

According to some example embodiments, the group of high priority activities includes at least one of: checking a paging channel; reading system information blocks; measuring a signal strength of a serving cell or neighbor cell; or establishing a packet switched data session.

According to some example embodiments, the scaled throughput (ScTP) includes a maximum of an uplink scaled throughput and a downlink scaled throughput.

According to some example embodiments, in determining the RF rejection percentage for the second SIM based on the ScTP of the first SIM, the method further includes computing a reverse bell curve graph using the determined scaled throughput of the first SIM, and determining the RF rejection percentage for the second SIM based on the prepared reverse bell curve graph.

According to some example embodiments, in determining the RF rejection percentage for the second SIM based on the ScTP of the first SIM, the method further includes determining whether a signal quality of the second SIM is poor, reducing the RF rejection percentage for the second SIM by an offset value if the signal quality of the second SIM is poor, and increasing the RF rejection percentage for the second SIM by the offset value if the signal quality of the second SIM is good.

According to some example embodiments, in determining the RF rejection percentage for the second SIM based on the ScTP of the first SIM, the method further includes determining a mobility condition of the DSDS device when the request for access to the RF resources is received from the second SIM, increasing the RF rejection percentage for the second SIM by an offset mobility value if the DSDS device is stationary, and decreasing the RF rejection percentage for the second SIM by the offset mobility value if the DSDS device is mobile.

Some example embodiments herein further describe a dual subscriber identification module (SIM) dual standby device for efficiently sharing RF resources among its two SIMs. According to some example embodiments, the DSDS device includes a first SIM; a second SIM; RF resources; and a DSDS controller. The DSDS controller is configured to receive, when a data session is ongoing in the first SIM, a request from the second SIM for access to the RF resources for performing an activity at the second SIM having higher priority than the data session. The DSDS controller is further configured to determine a scaled throughput for the first SIM. The DSDS controller is further configured to determine an RF rejection percentage for the second SIM based on the scaled throughput. Furthermore, the DSDS controller is configured to provide the RF resources to the second SIM based on the RF rejection percentage.

According to some example embodiments, a method performed by a Dual Subscriber Identification Module (SIM) Dual Standby (DSDS) controller is provided. The method includes receiving, when a data session is ongoing in a first SIM, a request for access to an RF transceiver by a second SIM. The method further includes determining, in response to the receiving, a scaled throughput for the first SIM. The method further includes determining an RF reduction percentage for the second SIM based on the scaled throughput. Furthermore, the method includes providing the second SIM with access to the RF transceiver based on the RF reduction percentage.

The foregoing has outlined, in general, the various aspects of some example embodiments and is to serve as an aid to better understand the more complete detailed description which is to follow. In reference to such, there is to be a clear understanding that the example embodiments are not limited to the methods or applications of use described and illustrated herein. It is intended that any other advantages and objects of the example embodiments that become apparent or obvious from the detailed description or illustrations contained herein are within the scope of the example embodiments.

BRIEF DESCRIPTION OF THE ACCOMPANYING DRAWINGS

The other objects, features and advantages will occur to those skilled in the art from the following description of some example embodiments and the accompanying drawings in which.

DETAILED DESCRIPTION

Some example embodiments disclose methods of efficiently sharing RF resources in a dual SIM dual standby device. In the following detailed description of some example embodiments, reference is made to the accompanying drawings that form a part hereof, and in which are shown by way of illustration some example embodiments which may be practiced. These example embodiments are described in sufficient detail to enable those skilled in the art to practice the example embodiments, and it is to be understood that other example embodiments may be utilized and that changes may be made without departing from the scope of the example embodiments. The following detailed description is, therefore, not to be taken in a limiting sense, and the scope of the example embodiments is defined only by the appended claims.

The specification may refer to "an", "one" or "some" example embodiment(s) in several locations. This does not necessarily imply that each such reference is to the same example embodiment(s), or that the feature only applies to a single example embodiment. Single features of different example embodiments may also be combined to provide other example embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features, integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some example embodiments provide methods of efficiently sharing RF resources in a dual SIM dual standby device. Various example embodiments are described in the present disclosure to describe the working of the methods, but not limiting to the scope of the example embodiments.

Figure 1:
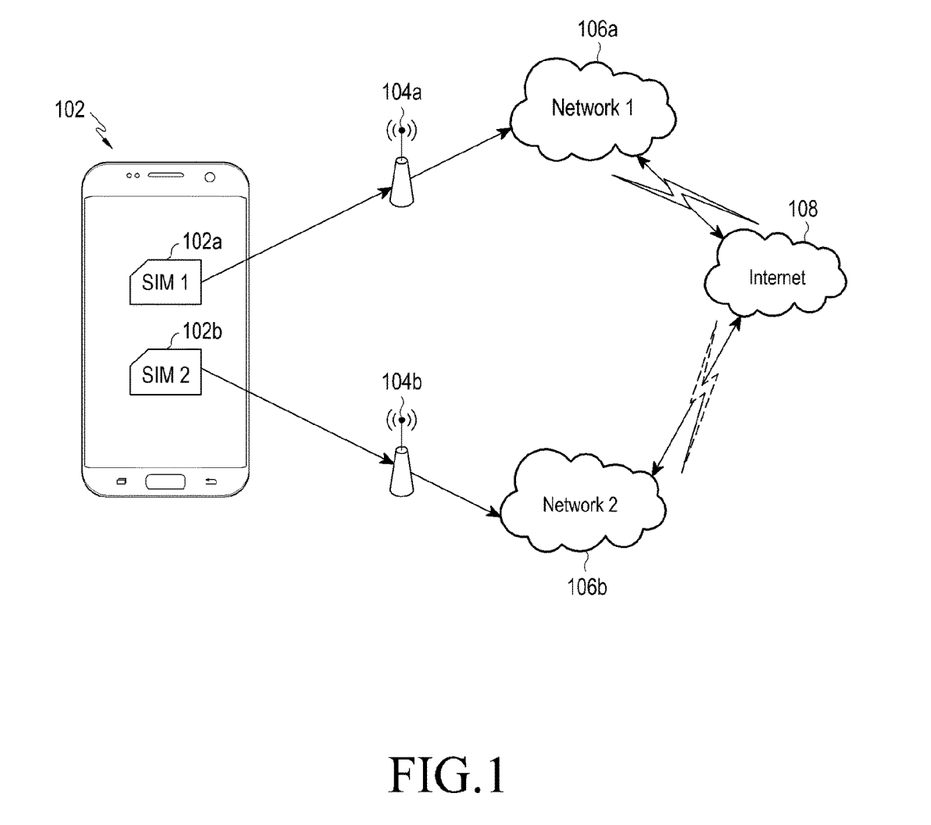
FIG. 1 illustrates an overall communication system diagram, according to some example embodiments.

FIG. 1 illustrates an overall communication system diagram, according to some example embodiments. As shown in FIG. 1, the system includes a DSDS device 102 (also referred to as a user equipment (UE)) having two SIMs 102a and 102b, wherein the first SIM 102a is connected to a first network 106a via a first base station 104a and the second SIM 102b is connected to a second network 106b via a second base station 104b. The first SIM 102a is connected to Internet 108 in order to provide packet data services to the DSDS device 102. For illustrative purposes, the first network 106a is shown as having direct connection with Internet 108 as the first SIM 102a is subscribed for data packet services from the first network, whereas the second SIM 102b is not subscribed for data services and hence the connection between second network 106b and Internet 108 is shown in dotted lines. In some example embodiments, the first and second network, both, correspond to a cellular network, for example, 2G, third generation (3G), code division multiple access (CDMA) or fourth generation (4G). The DSDS device 102 includes a single RF resource, or set of RF resources, for use by both of SIMs 102a and 102b and which may only be used by one of SIMs 102a and 102b at a time. The RF resource(s) is referred to hereafter in both the singular and plural and should be interpreted in both cases as corresponding to the single RF resource, or set of RF resources, of the DSDS device 102. In some example embodiments, the RF resource(s) refers to an RF transceiver of the DSDS device 102, as discussed further below in association with FIG. 3.

By way of example, suppose that the first SIM 102a (SIM 1) is in active data session with the first network 106a. That is, the RF resources are used by the first SIM 102a (SIM 1) for receiving data services from the Internet 108 via the first network 106a. However, if the second SIM 102b (SIM 2) wants to perform a higher priority activity, then the RF resources are used by SIM 2 thus reducing RF availability to SIM 1. Hence, the RF resources are not efficiently utilized for SIM 1.

Some example embodiments address the issue by determining a scaled throughput instead of instantaneous throughput. The scaled throughput is determined by considering one or more factors such as network load, network deployment, direction of data transfer, RAT type, mobility conditions, the signal quality of other RATs and the like. The peak data rate achieved varies depending upon these factors and affects uplink and downlink throughput accordingly. A DSDS controller present in the DSDS device determines scaled throughput (ScTP) for the first SIM and calculates an RF rejection percentage based on the ScTP. Later, based on the calculated RF rejection percentage, the RF resources are allocated to the second SIM.

Figure 2:
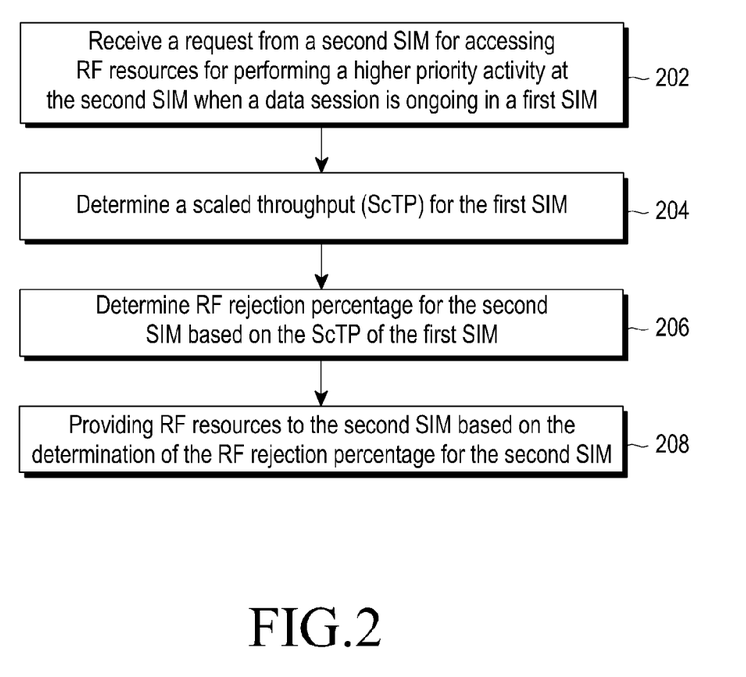
FIG. 2 is a flowchart diagram illustrating methods of efficiently sharing RF resources in a Dual Subscriber identification module (SIM) dual standby (DSDS) device, according to some example embodiments.

FIG. 2 is a flowchart diagram illustrating methods of efficiently sharing RF resources in a dual subscriber identification module (SIM) dual standby (DSDS) device, according to some example embodiments. As discussed further below in association with FIG. 3, the operations of the methods may be performed by a DSDS controller in the DSDS device. As shown in FIG. 1, the DSDS device includes two SIMs and uses a single RF resource for enabling communication. By way of example, suppose that a second SIM requests the RF resource for performing a high priority operation when a data session is ongoing in a first SIM. In some example embodiments, instead of merely sharing the RF resource to the second SIM, the DSDS device considers one or more factors to reject allocation of the RF resource to the second SIM. The process that efficiently shares RF resources between two SIMs is explained herein in detail as follows.

At operation 202, a request from a second SIM for access to RF resources, for performing a higher priority activity at the second SIM, is received when a data session is ongoing in a first SIM. The higher priority activity to be performed by the second SIM may be an activity belonging to a group of high priority activities, wherein the group of high priority activities may include signaling requests, paging reception and the like. For example, the higher priority activities may include at least one of checking a paging channel, reading system information blocks, measuring the signal strength of serving and neighbor cells, and establishing a packet switched data session. It would be understood by a person skilled in the art that the group of higher priority activities may be modified based on the example embodiments and hence is not limited to the above examples. Then, at operation 204, a scaled throughput (ScTP) for the first SIM is determined, where the ScTP is determined by considering one or more factors such as network load, network deployment, bandwidth, RAT type, UE capability, resource block (RB) and direction of data transfer. Since, the peak data rate of the first SIM depends on these factors; it is desirable to perform LTE throughput (TP) scaling to consistently apply the determination of whether to reject access by the second SIM to the RF resource across different deployments.

In some example embodiments, the ScTP is defined as maximum of scaled downlink (DL) and scaled uplink (UL) throughput. The ScTP is explained as follows.

$$ScTP_{UL} = TP_{UL} * D_{UL} * B * R_{UL} * L$$

$$ScTP_{DL} = TP_{DL} * D_{DL} * B * R_{DL} * L$$

$$ScTP = \max[ScTP_{UL}, ScTP_{DL}]$$

Where $TR$ = Instantaneous $LTE\ TP$ $D$ = Directional Scale = $D_{DL} = 1$, $D_{UL} = 2$;

$R$ = $RAT$ type scaling factor $$R_{DL} = \left[1 + \left(1 - \frac{\text{Number of } DL \text{ subframes}}{10}\right)\right]$$

$$R_{UL} = \left[1 + \left(1 - \frac{\text{Number of } UL \text{ subframes}}{10}\right)\right]$$

$T$ = period of time over which load is computed.

$$B = \text{Bandwidth scaling factor} = \frac{\text{Max\_Bandwidth}}{\text{serving Cell Bandwidth}}$$

$$L1 = \text{Network Load} = \frac{\sum_{t=0}^{T} RBs \text{ received by } UE}{T * \text{Max\_Num\_RB}}$$

$$L = \text{Load scaling factor} = \frac{1}{L1}$$

As mentioned above, factors such as network load, deployment, bandwidth, RAT type, data transfer direction, etc., affect the overall throughput of the DSDS device. The way in which network load affects the throughput of the DSDS device may be explained using the following example. Suppose that a user A is using a DSDS device for performing a data session in a railway station. The railway station is a crowded area and the number of users performing data sessions is relatively high. Accordingly, the load on a network near the railway station is also relatively high. The network attempts to serve all user data sessions with limited available resources. Therefore, a higher number of users performing data sessions with the same network may result in lower throughput. Some example embodiments involve the use of a load scaling factor (L) to address the overloaded network scenario described above.

Similarly, bandwidth is another factor which tends to affect the throughput of the DSDS device. Different spectrum will have different associated bandwidths and restrictions. For example, suppose that a device is connected to a bandwidth network of 20 MHz. For this 20 MHz bandwidth, the network may provide a data transfer speed of up to 100 Mbps to the connected device. On the other hand, if the same device is connected to a lower bandwidth of 10 MHz, then network may only provide a data transfer speed of up to 50 Mbps. Thus, depending on the bandwidth, the speed of uplink and downlink data transfer rate varies, and this in turn affects the throughput of the DSDS device. If the first SIM is getting a 50 Mbps data transfer speed, then a rejection percentage for the second SIM may reduce to 50%. However, with less bandwidth, a data transfer speed may be limited by the network. Therefore, some example embodiments consider bandwidth as an important factor in scaling throughput by introducing a scaling factor for bandwidth (B). Thus, even though the first SIM is connected to a lower bandwidth, the rejection percentage will be determined by considering scaled throughput. Other factors such as RAT type and direction of data transfer may also be considered for scaling throughput.

After determining the scaled throughput for the first SIM, at operation 206, RF rejection percentage for the second SIM is determined. In some example embodiments, the RF rejection percentage for the second SIM is determined using a reverse bell curve graph in which RF rejection percentage is higher at the low and high ends of the TP range. In some example embodiments, the RF rejection percentage for the second SIM may be determined using a linear curve graph, in which RF rejection percentage is directly proportional to the TP value. That is, the higher the TP value for SIM 1, the higher the RF rejection percentage for the second SIM, and vice versa. In some example embodiments, the RF rejection percentage may be determined using a logarithmic graph. It is to be noted that the appropriate graph may be selected based on an implementation.

Further, while determining RF rejection percentage for the second SIM, the signal quality of the second SIM is also considered. If the signal quality of the second SIM is poor, then the RF rejection percentage is reduced by an offset value. Thus, the second SIM is also given a chance to use the RF resource for performing its high priority activities. On the other hand, if the signal quality of the second SIM is good, then the RF rejection percentage is increased by the offset value. Furthermore, while determining the RF rejection percentage for the second SIM, the mobility condition of the DSDS device is considered. If the DSDS device is in stationary condition, then the RF rejection percentage is increased by an offset value. On the other hand, if the DSDS device is found to be in a mobile condition, then the RF rejection percentage is reduced by the offset value, so that the second SIM is also given a chance to use the RF resources. Based on the above determinations, at operation 208, the RF resources are provided to the second SIM. Thus, determining the RF rejection percentage reduces a miss rate in high priority activities associated with the second SIM and provides an efficient data session to the first SIM.

Figure 3:
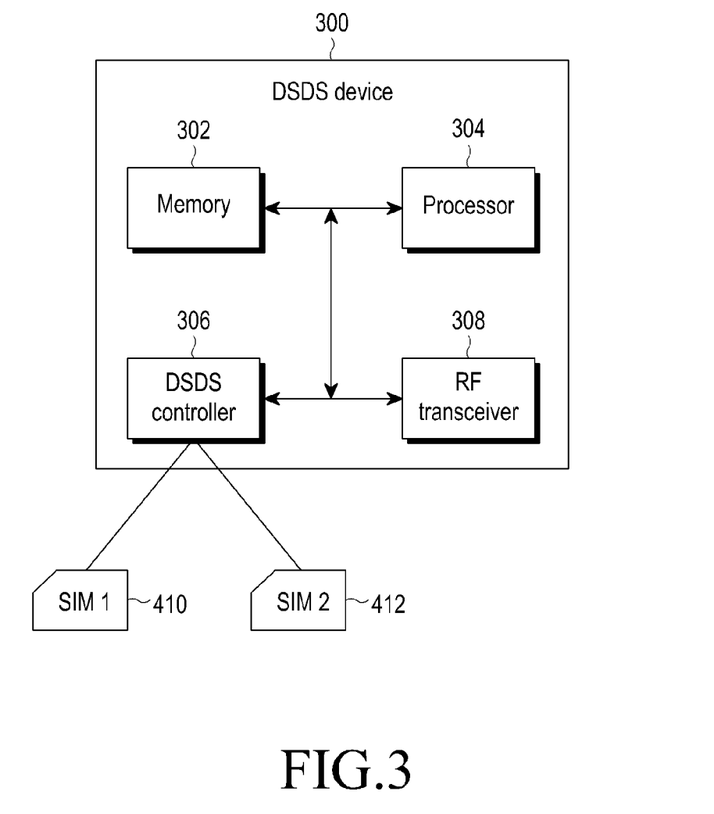
FIG. 3 is a block diagram illustrating various functional components of a DSDS device, according to some example embodiments.

FIG. 3 is a block diagram illustrating various functional components of a DSDS device, according to some example embodiments. In some example embodiments, the DSDS device 300 refers to any one or all of cellular telephones, smart phones, personal data assistants, laptop computers, tablets, computers, smart books, palm-top computers, wireless electronic mail receivers, multimedia Internet-enabled cellular telephones, wireless gaming controllers, and similar personal electronic devices. The DSDS device 300 includes a plurality of SIM cards 410 and 412, a processor 304, memory 302, a DSDS controller 306 and a RF transceiver circuit (also referred to as an RF transceiver) 308 for connecting to at least two mobile communication networks. Some example embodiments may be useful in mobile communication devices, such as smart phones, and so such devices are referred to in the descriptions of some example embodiments. However, some example embodiments may be useful in any electronic devices that may individually maintain at least one subscription and at least one RF chain, which may include one or more of antennae, radios, transceivers, etc. The DSDS controller 306 is operatively coupled to the two SIMs namely SIM 1 (depicted as element 410) and SIM 2 (depicted as element 412). The DSDS device 300 may also include additional components such as an antenna (not shown) for the purpose of clarity of the illustration.

The memory 302 stores instructions to be executed by the processor 304. In some example embodiments, the memory may include a random-access memory (RAM), a Read Only Memory (ROM), or another type of dynamic or static storage device, a removable memory card, and/or another type of memory that may store information and instructions for execution by the processor 304.

The processor 304 is configured to execute instructions stored in the memory 302. The processor 304 may include any one or more of a microprocessor, a controller, a digital signal processor (DSP), an application specific integrated circuit (ASIC), a field-programmable gate array (FPGA), or equivalent discrete or integrated logic circuitry. Additionally, the functions attributed to the processor 304, in this disclosure, may be implemented using as software, firmware, hardware or any combination thereof.

The DSDS controller 306 is configured to receive a request from a second SIM for accessing RF resources, for performing a higher priority activity at the second SIM, when a data session is ongoing in a first SIM. The DSDS controller is further configured to determine a scaled throughput (ScTP) for the first SIM. The DSDS controller also configured to determine an RF rejection percentage for the second SIM based on the determined ScTP of the first SIM. The DSDS controller, based on the above determinations, provides RF resources to the second SIM. According to some example embodiments, operations described herein as being performed by the DSDS controller may be performed by at least one processor executing program code that includes instructions corresponding to the operations. The instructions may be stored in a memory. The processor may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA).

The RF transceiver 308 is configured to enable the DSDS device 300 to communicate with other devices or systems in at least one network through SIM 1 and SIM 2. In the DSDS device 300, the RF transceiver 308 is separately utilized by two SIMs for establishing communication with their respective networks. The RF transceiver 308 communicates with the networks using any of the mobile communication technologies such as 3G, 4G, time-division multiple access (TDMA), CDMA and the like. For example, the RF transceiver 308 may help the DSDS device 300 to communicate with a LTE (4G) network for availing data services from the LTE network through SIM 1, whereas for SIM 2, the RF transceiver may help the DSDS device 300 to communicate with a global system for mobile communications (GSM) (2G) network to avail circuit switched (CS) services from the GSM network. It is to be noted that, the SIM 1 may be configured to operate on other networks such as 2G and CDMA, and SIM 2 may be configured to operate on LTE, 3G and other mobile networks.

Figure 4:
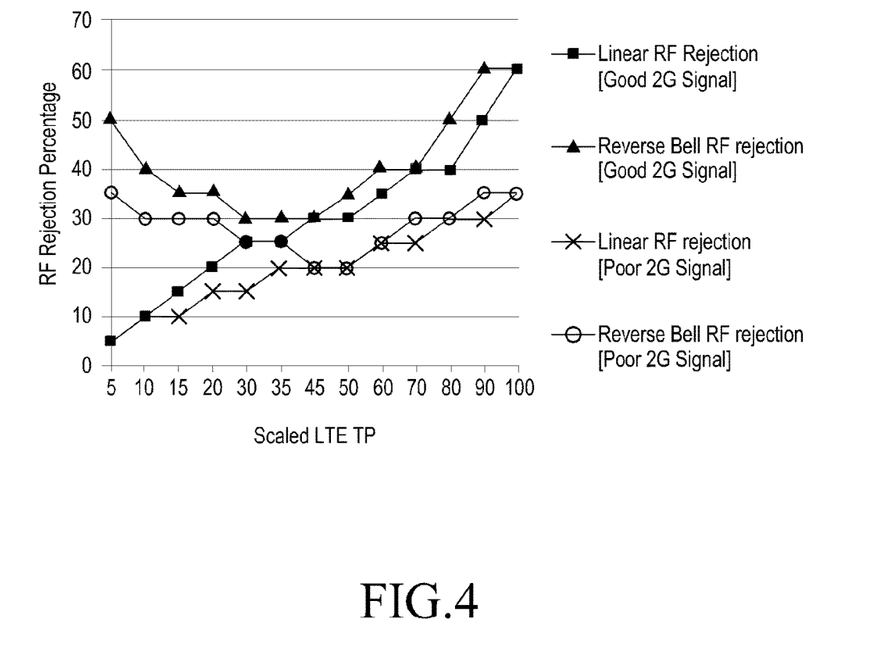
FIG. 4 is a schematic diagram illustrating various calculations performed using different graphs for determining RF rejection percentage for a SIM in a DSDS device, according to some example embodiments.

FIG. 4 is a schematic diagram illustrating various calculations performed using different graphs for determining an RF rejection percentage for a SIM in a DSDS device, according to some example embodiments. Consider that a second SIM requests access to RF resources when a data session is ongoing in a first SIM. The DSDS device includes a DSDS controller configured to allow/reject the RF request. Instead of merely allowing or rejecting the request for access to RF resources from the second SIM, the DSDS controller determines an RF rejection percentage for the second SIM. The DSDS controller then allocates the RF resources based on the RF rejection percentage. Different types of graphs such as a reverse bell graph, a linear graph and a logarithmic graph may be applied to a scaled throughput determined for the first SIM in order to determine an RF rejection percentage. The RF rejection percentage calculated using a reverse bell curve graph and a linear graph for both good and bad signal conditions of the second SIM is shown in FIG. 4.

In the preceding detailed description of some example embodiments, reference is made to the accompanying drawings that form a part hereof, and in which are shown by way of illustration specific example embodiments which may be practiced. These example embodiments are described in sufficient detail to enable those skilled in the art to practice the example embodiments, and it is to be understood that other example embodiments may be utilized and that changes may be made without departing from the scope of the example embodiments. The following detailed description is, therefore, not to be taken in a limiting sense, and the scope of the example embodiments is defined only by the appended claims.

What is claimed is:

1. A method performed by a dual subscriber identification module (SIM) dual standby (DSDS) controller for efficiently sharing radio frequency (RF) resources in a DSDS device, the method comprising:
   receiving, when a data session is ongoing in a first SIM, a request from a second SIM for access to the RF resources for performing an activity at the second SIM having higher priority than the data session;
   determining a scaled throughput for the first SIM;
   determining an RF rejection percentage for the second SIM based on the scaled throughput; and
   providing the second SIM with access to the RF resources based on the RF rejection percentage.

2. The method of claim 1, wherein the determining the scaled throughput includes considering one or more of:
   a load on a network side;
   a type of network being deployed;
   a direction of data transfer;
   a type of radio access technology (RAT) used by the first SIM;
   a mobility condition of the DSDS device; or
   a signal quality of other RATs.

3. The method of claim 2, wherein the scaled throughput is determined based on an inverse term of the load on the network side.

4. The method of claim 1, wherein the scaled throughput is determined based on a ratio of maximum bandwidth to a serving cell bandwidth.

5. The method of claim 1, wherein the activity to be performed by the second SIM includes an activity belonging to a defined group of high priority activities.

6. The method of claim 5, wherein the group of high priority activities includes at least one of:
   checking a paging channel;
   reading system information blocks;
   measuring a signal strength of a serving cell or neighbor cell; or
   establishing a packet switched data session.

7. The method of claim 1, wherein the scaled throughput includes maximum of an uplink scaled throughput and a downlink scaled throughput.

8. The method of claim 1, wherein determining the RF rejection percentage comprises:
   computing a reverse bell curve graph using the scaled throughput; and
   determining the RF rejection percentage for the second SIM based on the reverse bell curve graph.

9. The method of claim 1, wherein determining the RF rejection percentage comprises:
   determining whether a signal quality of the second SIM is poor;
   reducing the RF rejection percentage for the second SIM by an offset value if the signal quality of the second SIM is poor; and
   increasing the RF rejection percentage for the second SIM by the offset value if the signal quality of the second SIM is good.

10. The method of claim 1, wherein determining the RF rejection percentage comprises:
    determining a mobility condition of the DSDS device when the request for access to the RF resources is received from the second SIM;
    increasing the RF rejection percentage for the second SIM by an offset mobility value if the mobility condition of the DSDS device is stationary; and
    reducing the RF rejection percentage for the second SIM by the offset mobility value if the mobility condition of the DSDS device is mobile.

11. A dual subscriber identification module (SIM) dual standby (DSDS) device, the DSDS device comprising:
    a first SIM;
    a second SIM;
    RF resources; and
    a DSDS controller configured to
       receive, when a data session is ongoing in the first SIM, a request from the second SIM for access to the RF resources for performing an activity at the second SIM having higher priority than the data session;
       determine a scaled throughput for the first SIM;
       determine an RF rejection percentage for the second SIM based on the scaled throughput; and
       provide the RF resources to the second SIM based on the RF rejection percentage.

12. The DSDS device of claim 11, wherein the scaled throughput is determined by considering one or more of:
    a load on a network side;
    a type of network being deployed;
    a direction of data transfer;
    a type of radio access technology (RAT) used by the first SIM;
    a mobility condition of the DSDS device; or
    a signal quality of other RATs.

13. The DSDS device of claim 12, wherein the scaled throughput is determined based on an inverse term of the load on the network side.

14. The DSDS device of claim 11, wherein the scaled throughput is determined based on a ratio of maximum bandwidth to a serving cell bandwidth.

15. The DSDS device of claim 11, wherein the activity to be performed by the second SIM includes an activity belonging to a defined group of high priority activities.

16. The DSDS device of claim 15, wherein the group of high priority activities includes at least one of:
    checking a paging channel;
    reading system information blocks;
    measuring a signal strength of a serving cell or neighbor cell; or
    establishing a packet switched data session.

17. The DSDS device of claim 11, wherein the scaled throughput includes maximum of an uplink scaled throughput and a downlink scaled throughput.

18. The DSDS device of claim 11, wherein the DSDS controller is further configured to:
    compute a reverse bell curve graph using the scaled throughput; and
    determine the RF rejection percentage for the second SIM based on the reverse bell curve graph.

19. The DSDS device of claim 11, wherein the DSDS controller is further configured to:
- determine whether a signal quality of the second SIM is poor;
- reduce the RF rejection percentage for the second SIM by an offset value if the signal quality of the second SIM is poor; and
- increase the RF rejection percentage for the second SIM by the offset value if the signal quality of the second SIM is good.

20. The DSDS device of claim 11, wherein the DSDS controller is further configured to:
- determine a mobility condition of the DSDS device when the request for access to the RF resources is received from the second SIM;
- increase the RF rejection percentage for the second SIM by an offset mobility value if the mobility condition of the DSDS device is stationary; and
- reduce the RF rejection percentage for the second SIM by the offset mobility value if the mobility condition of the DSDS device is mobile.

* * * * *